United States Patent Office 3,459,040
Patented Aug. 5, 1969

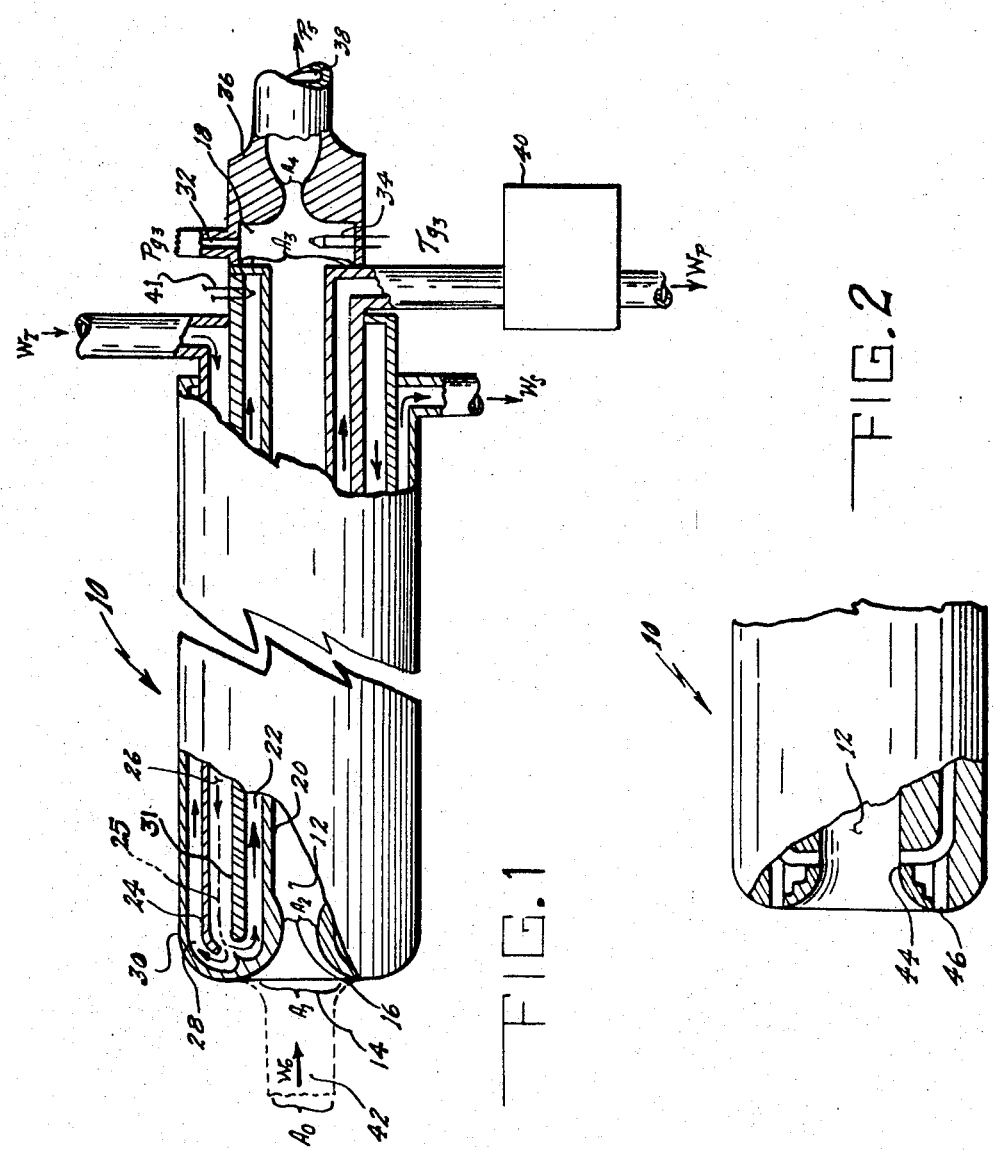

3,459,040
ENTHALPY SENSOR
Carl R. Halbach, Canoga Park, Calif., assignor to the United States of America as represented by the Secretary of the Air Force
Filed Nov. 23, 1966, Ser. No. 596,738
Int. Cl. G01k 17/10
U.S. Cl. 73—190                               1 Claim

ABSTRACT OF THE DISCLOSURE

An enthalpy sensor including a cylindrically shaped duct with a plenum chamber and metering nozzle at one end, a split flow coolant chamber surrounding the duct and measuring devices including one thermocouple and a pressure tap in the plenum chamber and one thermocouple in the coolant flow stream wtih a flow meter in the coolant flow system.

---

This invention relates generally to an enthalpy sensor, and more specifically to a single probe which will provide three independent thermal measurements, including two of gas total temperature and one of gas total specific enthalpy.

In the test sequence for rocket and jet engines and their nozzle components, it is necessary to determine the stream temperature of hot exhaust gases as well as the enthalpy (energy) of the gas stream. In the past this was done by using separate probes to make independent measurements; however, the response to such measurements is slow and less accurate than if one probe were used to take all measurements.

It is an important object of this invention to provide a probe which combines the concepts of conservation of mass, conservation of energy, and heat transfer for three independent thermal measurements.

It is another object of this invention to provide a new and improved enthalpy sensor which has more rapid response than any hitherto known.

It is a further object of this invention to provide an enthalpy sensor which will measure temperature in gas streams.

It is still another object of this invention to provide a new and improved enthalpy sensor which is more accurate than any before known.

It is still a further object of this invention to provide a new and improved method of sensing enthalpy in a reactive gas stream.

It is still another object of this invention to provide an enthalpy sensor which is economical to produce and utilize conventional, currently available components that lend themselves to standard mass production manufacturing techniques.

These and other advantages, features and objects of the invention will become more apparent from the following description taken in connection with the illustrative embodiments in the accompanying drawings wherein:

FIG. 1 is a side elevation view partly in section of the enthalpy sensor of this invention; and FIG. 2 is an alternative throat configuration for the enthalpy sensor of FIG. 1 shown in a side elevation view, also partly in section.

Referring now to FIG. 1, there is shown generally a enthalpy sensor 10. The sensor consists of a duct 12 which has an inlet 14 with inlet throat 16 at one end and plenum chamber 18 at the opposite end. Duct 12 is enclosed by a tube 20, an annular passage 22, another tube 24, which separates passages 26 and 28, and outer wall 30. A thermal insulating wall 31 separates annular passage 22 and 26. The split coolant flow design allows optimization of primary coolant flow and accurate measurement of initial coolant temperature by continuous measurement. The plenum chamber 18 contains a pressure tap 32 and thermocouple 34 and is connected by flow metering nozzle 36 to exhaust duct 38. Meter 40 is connected to primary coolant passage 22 to measure the coolant flow rate, while coolant temperature is measured by thermocouple 41. In operation, the gas sample from the hot gas environment defined by flow stream tube 42 with mass flow rate $W_0$ is aspirated into sensor inlet 14. In subsonic flow streams, the cross sectional area $A_0$ of stream tube 42 gradually adjusts to $A_1$ at inlet 14. In supersonic flow, a detached bow wave stands off inlet 14 and area $A_0$ remains constant up to and through the shock wave and then adjusts to $A_1$ in the subsonic flow field behind the shock. The gas sample then is accelerated to maximum velocity in the minimum flow area $A_2$ of inlet nozzle throat 16. The sample is cooled through tube wall 20 by giving up energy to the primary coolant flow in passage 22 as it passes along duct 12 to plenum chamber 18. The total coolant flow rate $W_T$ from coolant channel 26 splits into passage 22 with flow rate $W_P$ and channel 28 with secondary coolant flow rate $W_S$. The coolant in channel 28 cools the outer sensor wall 30.

The cooled gas sample in the plenum chamber 18 is accelerated to sonic velocity in flow metering nozzle 36 by a sufficiently low exhaust pressure $P_5$ in duct 38. Pressure tap 32 and thermocouple 34 continuously measure the gas sample pressure, $P_{g_3}$, and temperature $T_{g_3}$. The gas sample flow rate through nozzle 36 is determined from the mass flow equation.

$$W = \frac{P_t C_D A_4 (P/P_t \overset{0}{m})}{\sqrt{T_t}} \quad (1)$$

where $C_D$ is the nozzle discharge coefficient, and $(P/P_t \overset{0}{m})$, the mass flow parameter, is a function of the gas properties and the Mach number through nozzle 36. For isentropic flow from plenum chamber 18 wtih flow area $A_3$ to nozzle 36 with flow area $A_4$, $P_t = P_{g_3}$ and $T_t = T_{g_3}$. For steady flow conditions, the measured gas sample flow rate is equal to the flow at any point in the flow passage from inlet 14 to the exhaust duct 38.

To obtain the mass conservation temperature of the gas inlet stream tube 42, Equation 1 is applied to the inlet throat area $A_2$;

$$W = \frac{P_t \, C_{D_2} A_2 (P/P_t \overset{0}{m})_2}{\sqrt{T_{t_2}}} \quad (2)$$

The effective flow area $C_{D_2} A_2$ is obtained by cold flow calibration or from analytical determination of $C_{D_2}$ and measurement of $A_2$. Total pressure $P_{t_2}$ corresponds to the pressure indicated at $P_{g_3}$ with a valve (not shown) in exhaust duct 38 closed or by a separate impact probe alongside the sensor. The mass flow parameter, $P/P_t \overset{0}{m}$, is calculated for the gas properties and Mach number at the inlet nozzle throat ($A_2$). For choked flow, the Mach number is known to be unity. For subsonic flow, the throat static pressure is obtained from a static pressure tap (not shown) and the Mach number is calculated from the pressure ratio $P_2/P_{t_2}$. The inlet throat temperature $T_{t_2}$ is then determined by calculation. An analytical correction is made for viscous and heat transfer effects of the flow over the converging portion of inlet nozzle 16 to arrive at the gas total temperature in the undisturbed stream.

The total enthalpy of the undisturbed stream is determined by using the principle of conservation of energy. The energy of the gas sample at inlet flow area $A_1$ and at flow area $A_3$ in the plenum upstream of gas metering nozzle 36 must be in balance. The energy balance equation solved for the total enthalpy at flow area $A_0$ is:

$$h_{t_{g_0}} = h_{t_{g_2}} + \frac{W_P}{W_o}\left(h_{t_{c_3}} - h_{t_{c_1}}\right) \quad (3)$$

where $$h_{t_{g_3}}$$

is the total enthalpy measured by thermocouple $T_{g_3}$ and pressure $P_{g_3}$ with Mollier data known for the gas flowing through $A_3$. The enthalpy rise of the coolant $$h_{t_{c_3}} - h_{t_{c_1}}$$

is equal to the specific heat of the coolant times the measured temperature rise of the coolant $C_c(T_{c3} - T_{c1})$.

$$C_c(T_{c3} - T_{c1})$$

$W_p$ is the primary coolant flow rate measured with meter 40. The energy conservation gas temperature is calculated from Mollier data for the gas using the measured total enthalpy and impact pressure at the inlet.

The final measurement of gas temperature involves a heat transfer correlation with measured parameters. For a sensor with duct 12 smooth and relatively straight, theoretical heat transfer is correlated with the measurements of $T_{g_3}$ and $P_{g_3}$ to estimate $$T_{t_{g_0}}$$

The mass continuity capability combined with the conservation of energy capability in the subject invention are complimentary for measurements in transient environments. Typically the time constant of the conservation of energy computed gas enthalpy is of the order of 2 seconds. On the other hand, the mass continuity computed temperature time constant is of the order of 0.1 second. Hence, the dual capability is complimentary in that enthalpy measurements in a steady state environment can be used to calibrate the senor while the mass continuity computed temperature can be used during transients for more rapid response.

The enthalpy sensor shown in FIG. 1 and described above is a choked inlet throat type of mass conservation probe. An alternate configuration has a subsonic inlet throat mass conservation probe capability. The subsonic inlet throat configuration shown in FIG. 2, has an inlet static tap 44 and a leading edge static tap 46, each located approximately forty-five degrees from the nominal stagnation point. These taps are used to monitor the location of the gas stagnation point so that the coolant-to-gas stagnation points can be matched for all ambient flow conditions. For some applications where stagnation point control is not required, the taps can be eliminated and an analytical correction made.

The dotted lines 25 of FIG. 1 represent the stagnation stream tubes 42 of the gas sample and of the coolant flow. Nominally these are matched so that gas sample heat is given up only to the primary coolant flow 22 to be accounted for in the energy balance. For applications where large variations in ambient flow are encountered, the gas sample stagnation stream 42 may change with the result that the coolant and gas sample stagnation locations will be mismatched. The alternate configuration with the subsonic inlet throat can be used in this case since the back pressure can be adjusted to change the gas sample flow rate. In this way, the coolant-to-gas stagnation points can be matched for all ambient flow conditions. The location of the stagnation point is monitored by static taps 44 and 46, shown in FIG. 2.

Although the invention has been described with reference to particular embodiments, it will be understood by those skilled in the art that the invention is capable of a variety of alternative embodiments within the spirit and scope of the appended claim.

What is claimed is:

1. An enthalpy sensing device for determining the energy in a high temperature gas stream comprising: a cylindrically shaped hollow chamber having an inlet nozzle at one end and a plenum area having an exhaust nozzle at the other end along the longitudinal axis thereof; means for cooling said chamber including a split flow cooling jacket mounted around the cylinder, having an insulating member dividing the flow path through the jacket into a pair of paths, the first path surrounding and cooling the chamber, and the second path being between the first path and the exterior of the jacket for insulating the jacket from the ambient temperature; means partially restricting said inlet nozzle; means for measuring the flow of coolant in the first path; first temperature sensing means for measuring the coolant temperature in the first path adjacent the chamber at its point of discharge; a second temperature sensing means mounted in the plenum area for measuring the temperature of the gas stream and means for measuring the sample gas pressure in the plenum area.

References Cited

UNITED STATES PATENTS 3,167,956   2/1965   Grey _____ 73—190

JAMES J. GILL, Primary Examiner